Patented Oct. 5, 1954

2,691,047

UNITED STATES PATENT OFFICE 2,691,047

PREPARATION OF OXO ALDEHYDES USING GLYCOL SOLVENTS

Hugh J. Hagemeyer, Jr., Kingsport, Tenn., assignor to Eastman Kodak Company, Rochester, N. Y., a corporation of New Jersey No Drawing. Application October 19, 1951,
Serial No. 252,193

9 Claims. (Cl. 260—604)

The present invention is concerned with improvements in the so-called Oxo process for the reaction of olefins with carbon monoxide and hydrogen to form oxygenated products having one more carbon atom than the olefin reacted. It is particularly concerned with a process employing a class of organic compounds which are new to the Oxo process as reaction media. These compounds are the water soluble acylic monoalkyl glycol ethers, such as the monoalkyl ethers of ethylene, propylene, and butylene glycols and the monoalkyl ethers of polyethylene, polypropylene and polybutylene glycols.

I have found that the use of the monoalkyl ethers of ethylene, propylene and butylene glycols has several outstanding advantages over the reaction media disclosed in the prior art and/or in the research of applicant's co-workers, for example, hydrocarbons, alcohols, etc. These advantages include:

1. In a continuous process employing a circulatory compressor, such as is illustrated in applicant's copending application with David C. Hull, Serial No. 78,938, filed March 1, 1949, and now abandoned, the reaction capacity of a given system is determined by the recycle gas flow and the rate of product removal from the reactor space. With hydrocarbons and even to some extent with lower aliphatic alcohol media, the recycle gas flow must be kept relatively low to prevent frothing of the catalyst liquid, which results in catalyst entrainment and other objectionable features such as poor distribution, dry catalyst, loss of product through condensations, etc. The solvents of the present invention are excellent antifoaming agents, have relatively low vapor pressures, and the reaction capacity of a given reactor space is substantially increased, 25-40 per cent, by their use.

2. The monoalkyl ethers of ethylene, propylene, and butylene glycols, are particularly suitable as reaction media for the Oxo process since they are readily compatible with all of the components present in the reactor space, such as olefins, aldehydes, high boilers and water. The glycol ethers thus insure a completely homogeneous liquid phase in the reactor space even at water concentrations as high as 20 per cent. Water in substantial amount is desirable in the reactor space to stabilize the aldehyde product and minimize losses due to the formation of acetals and aldol condensation products. Water is also a promoter for the Oxo catalyst, and higher reaction rates are observed where the water content in the reactor space is 5-20 per cent of the total reactor liquid.

3. The glycol ethers of the present invention, such as the monoalkyl ethers of ethylene, propylene, and butylene glycols are superior solvents for the oils and waxes formed by homocondensation of the olefins. These oils and waxes are less readily soluble in hydrocarbons and quickly absorb out on and deactivate the catalyst where a solid catalyst and/or catalyst carrier is used. Even the lower aliphatic alcohols are not as good solvents for these materials as the glycol ethers. In addition to increasing the life of the catalyst before reactivation is necessary, the glycol monoethers are useful in regenerating spent catalysts by extraction therewith.

In such regeneration, the catalyst is washed, so to speak, with the glycol ether, with or without removal of the catalyst from the reactor space, to dissolve accumulated waxes, oils and the like from the catalyst. If this is not done, the action of the catalyst is greatly diminished, since these waxes and the like cover up the catalyst and prevent contact with the reaction mixture.

4. The glycol monoethers form very stable, low vapor pressure complexes with soluble metal carbonyl compounds and suppress the loss of cobalt as volatile cobalt carbonyl hydride (B. P. 26° C.). These complexes are formed as follows:

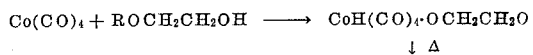

The cobalt carbonyl-glycol monoethers complexes are also excellent catalysts for the Oxo reaction as I have found quite unexpectedly.

5. High yields of the desired straight chain aldehydes are obtained, thus decreasing separatory difficulties encountered when the Oxo reaction is carried out in such manner as to produce lower yields.

It is an object of the invention to provide an improved process for the production of oxygenated compounds by the reaction of olefins, carbon monoxide and hydrogen using a reaction medium comprising a water soluble acyclic monoalkyl glycol ether in the presence of a catalyst comprising a source of at least one eighth group metal carbonyl.

A further object of the invention is the provision of a new reaction medium for the so-called Oxo process.

Another object of the invention resides in the provision of a new catalyst for the Oxo process, namely the eighth group metal complexes which are formed by the ethers which comprise the new reaction media of this invention.

Another object of the invention is to improve the Oxo process, as by increasing the reaction capacity of a given reactor space, by providing higher reaction rates, by increasing catalyst life, and by suppressing the loss of catalyst through volatilization.

Still another object resides in the provision of an improved method of regenerating an Oxo reaction catalyst, comprising contacting it with a glycol monoether.

Typical of the glycol monoethers useful in the present process are the methyl, ethyl, propyl, isopropyl, butyl and isobutyl monoethers of ethylene, propylene, and butylene glycols; the $C_1$–$C_4$ ethers of di- and triethylene glycols; and the $C_1$–$C_4$ ethers of dipropylene and dibutylene glycols. In general all monoalkyl ethers of $C_2$–$C_4$ glycols and polyglycols which are water-soluble and have boiling points in the range of 120–250° C. have been shown to be superior media for the Oxo reaction and particularly for the oxonation of $C_2$–$C_4$ olefins.

In the manufacture of oxygenated compounds according to the invention, olefins, carbon monoxide and hydrogen are reacted at 40–700 atmospheres and a temperature of 50–250° C. in the presence of a carbonyl forming eighth group metal catalyst. Typical solid Oxo catalysts containing a substantial portion of eighth group metal such as cobalt and/or iron supported on diatomaceous earth, silica gel, filtercel, kieselguhr and the like, and with or without additional promoter materials such as thoria, alumina, silica, magnesia and manganese are used. For example, a catalyst containing 36% Co—2% $ThO_2$—2% MgO—60% filtercel, and 40–70% reduced, is suspended in a suitable glycol monoether and charged to a reactor. Metal carbonyls such as cobalt carbonyl, cobalt tricarbonyl, iron carbonyl and/or mixtures thereof dissolved and/or complexed with the glycol monoether can be used according to the invention.

In continuous operation a suspension and/or solution of the catalyst in a glycol monoether is charged to a column reactor containing baffles and maintained at 75–200° C. and 40–700 atmospheres. The preferred operating range for a maximum yield of aldehydes is 2000–3000 p. s. i. and 120–160° C. Agitation is provided by circulating the synthesis gas rich in hydrogen through the reactor space with a recycle compressor. Aldehyde product and a small amount of diluent are distilled out at a controlled rate and separated by distillation. Entrained and/or regenerated catalyst is returned continuously to the reactor space as a suspension and/or solution in the recovered glycol monoether. Apparatus has not been shown in the present application since novelty is not claimed in any apparatus. However, reference may be had to applicant's copending application with David C. Hull, Serial No. 78,938, filed March 1, 1949, for a showing of apparatus useful in carrying out the present invention.

The relatively mild conditions at which the Oxo reaction is carried out according to the present invention are illustrative of the increased ease of the reaction when the media and catalysts of the present invention are used. This will be even more apparent from the following examples showing comparative tests using these and other media under standardized conditions falling within the preferred range of operating conditions referred to above.

Example 1

The following table shows comparative rates of aldehyde production for 10% slurries of a cobalt-thoria-magnesia on filtercel catalyst (36/2/2/60) in various reaction media employed during the oxonation of ethylene.

| Autoclave Charge | Aldehyde, G. Mols/Hr. | G. Mols Olefin Reacted/hr. |
|---|---|---|
| 200 g. diethyl ether | 4.3 | 3.6 |
| 190 g. butanol–10 g. $H_2O$ | 11.4 | 3.8 |
| 190 g. Carbitol–10 g. $H_2O$ | 14.6 | 3.8 |
| 190 g. ethyl Cellosolve–10 g. $H_2O$ | 19.4 | 3.5 |
| 190 g. 3-MeO Butanol–10 g. $H_2O$ | 17.9 | 4.1 |
| 190 g. 3-EtO Butanol–10 g. $H_2O$ | 18.3 | 3.8 |
| 200 g. butanol | 11.8 | 3.9 |
| 200 g. methyl Cellosolve | 14.2 | 3.6 |

It is apparent from the above rocker runs that the reaction rates are higher for the glycol monoethers than for either butanol or ether, both in the presence and absence of water.

Example 2

A series of runs similar to those of Example 1 was made oxonating propylene.

| Autoclave Charge [1] | Aldehyde, G. Mols/Hr. | G. Mols Olefin Reacted/hr. |
|---|---|---|
| Toluene | 2.3 | 1.4 |
| Isobutanol | 19.8 | 5.3 |
| N-Butanol | 22.3 | 5.1 |
| Ethyl Cellosolve | 26.2 | 5.4 |
| Ethyl Carbitol | 25.7 | 7.3 |
| 3-Ethoxy Butanol | 24.9 | 5.3 |
| 3-Methoxy Butanol | 27.7 | 5.8 |
| Methyl Cellosolve | 23.2 | 5.3 |

[1] Ten percent water was added in all runs.

The above examples show the greater reaction rates achieved by use of the glycol ethers, and in the case of some prior art media, show that quantitatively the reaction proceeded much more poorly using the prior art media.

I wish to make it clear that I have used the term olefin in the specification and claims in a broad sense to denote organic unsaturated compounds having olefinic unsaturation.

I claim:

1. In a process for the production of oxygenated compounds by the reaction of normally gaseous $C_2$–$C_4$ olefins, carbon monoxide and hydrogen, in the presence of a catalyst containing an element selected from the group consisting of cobalt and iron in a form capable of catalyzing the Oxo reaction, the step comprising carrying out the reaction in a reaction medium comprising, as the predominant ingredient, an ether selected from the group consisting of the water-soluble acyclic monoalkyl ethers of ethylene, propylene and butylene glycol, said ether being present in a quantity sufficient to provide a homogeneous liquid phase in the reactor.

2. A process according to claim 1 wherein the ether has a boiling point in the range of 120–250° C.

3. A process according to claim 1 wherein the metal is cobalt.

4. A process according to claim 1 wherein the metal is cobalt and the glycol ether is diethylene glycol monoethyl ether.

5. A process according to claim 1 wherein the metal is cobalt and the glycol ether is ethylene glycol monoethyl ether.

6. A process according to claim 1 wherein the metal is cobalt and the glycol ether is 3-methoxy butanol.

7. A process according to claim 1 wherein the metal is cobalt and the glycol ether is 3-ethoxy butanol.

8. A process according to claim 1 wherein the metal is cobalt and the glycol ether is ethylene glycol monomethyl ether.

9. A process according to claim 1 wherein the reaction medium includes about 5–20% water.

References Cited in the file of this patent

UNITED STATES PATENTS

| Number | Name | Date |
|---|---|---|
| 1,603,593 | Young | May 31, 1927 |
| 1,770,166 | Bent | July 8, 1930 |
| 2,204,157 | Semon | June 11, 1940 |
| 2,250,421 | Riblett | July 22, 1941 |
| 2,276,921 | Brown | Mar. 17, 1942 |
| 2,497,303 | Gresham et al. | Feb. 14, 1950 |
| 2,500,056 | Barr | Mar. 17, 1950 |
| 2,508,743 | Bruner | May 23, 1950 |
| 2,517,383 | Brooks | Aug. 1, 1950 |
| 2,542,417 | Kleinschmidt | Feb. 20, 1951 |
| 2,641,613 | Mertzweiller et al. | June 9, 1953 |